No. 724,731. PATENTED APR. 7, 1903.
D. NOBLE & H. WALDEN.
LACING HOOK.
APPLICATION FILED JULY 5, 1901.
NO MODEL.
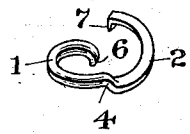
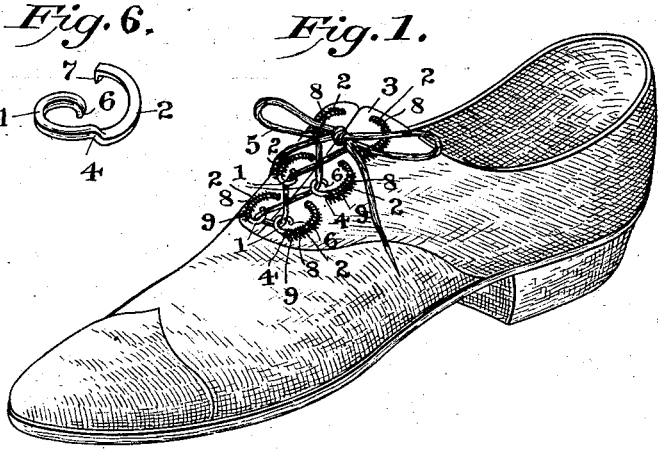
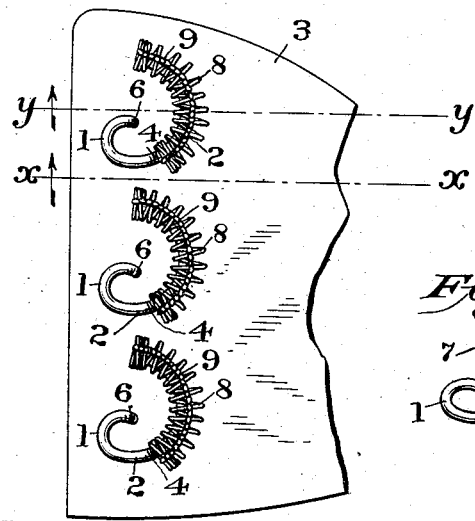
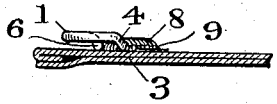
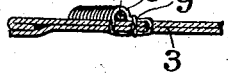
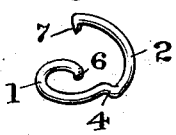
WITNESSES:
W. R. Abercrombie.
H. E. Smallbone.
INVENTORS
DONALD NOBLE
HENRY WALDEN
BY J. S. Finch.
ATTORNEY

UNITED STATES PATENT OFFICE.

DONALD NOBLE, OF LONDON, ENGLAND, AND HENRY WALDEN, OF PHILADELPHIA, PENNSYLVANIA.

LACING-HOOK.

SPECIFICATION forming part of Letters Patent No. 724,731, dated April 7, 1903.

Application filed July 5, 1901. Serial No. 67,200. (No model.)

*To all whom it may concern:*

Be it known that we, DONALD NOBLE, a subject of the King of Great Britain, and a resident of London, in the county of Middlesex, England, and HENRY WALDEN, a citizen of the United States, and a resident of Philadelphia, in the county of Philadelphia and State of Pennsylvania, have invented certain new and useful Improvements in Lacing-Hooks, of which the following is a specification.

Our invention relates to certain new and useful improvements in shoe-lacing hooks, and has for its object to provide a lacing-hook which will lie approximately flat against the shoe and avoid the liability of the wearer's clothing catching thereon and becoming frayed or torn; and our invention consists in forming such hook with a tail or stem for attachment to the shoe-upper by means of a line of contiguous overseam-stitches, said stem being preferably bent or curved, so as to prevent the hook from tilting or rocking after its attachment to the shoe-upper.

Our invention further consists in certain details of construction, which will more fully hereinafter appear and be particularly designated by the claims.

Referring to the accompanying drawings, which form a part of this specification, and in which like parts are similarly designated, Figure 1 is a perspective view of a shoe equipped with our improved lacing-hooks; Fig. 2, a plan view, somewhat enlarged, of a portion of a shoe-upper with a series of our improved lacing-hooks attached thereon; Fig. 3, a sectional elevation taken in the plane indicated by the line *x x* on Fig. 2; Fig. 4, a view similar to Fig. 3, but taken in the plane indicated by the line *y y* on Fig. 2; Fig. 5, a detail perspective view of the lacing-hook detached looking from the top side thereof; and Fig. 6, a detail perspective view similar to Fig. 5, but showing the hook as when made by stamping out of sheet metal.

1 is the lace-engaging loop of the hook, and 2 the body portion or stem for attachment to the shoe-upper 3. Between the lace-engaging loop 1 of the hook and the body portion 2 is formed a slight offset 4, which serves to raise said lace-engaging loop a sufficient distance away from the shoe-upper to permit the lacing-string 5 to be readily introduced between the loop 1 and the shoe-upper, and it will be seen that said loop extends in a plane approximately parallel with the surface of said shoe-upper. The free end of the lace-engaging loop is bent inward toward the shoe-upper, as shown at 6, to prevent the wearer's clothing from catching thereon and becoming frayed or torn.

As shown in Figs. 1 to 6, inclusive, the stem or body portion 2 of the hook comprises a loop preferably arcuate in contour and adapted to lie flat against the shoe-upper. The extremity of said stem is formed with an inwardly-projecting anchoring-spur 7, which pierces the shoe-upper slightly and serves to restrain the hook from shifting thereon.

The hook is secured upon the shoe-upper by means of radially-disposed overseam-stitches 8, which extend over the curved stem 2 from the offset 4 to a point just beyond the anchoring-spur 7, and we prefer to tie down said overseam-stitches 8 with an additional row of plain stitches 9, which intersect said overseam-stitches at a point close up to the stem 2, thereby greatly strengthening the securing element and adding a decided improvement to the appearance thereof; but we do not wish to circumscribe our invention in this respect, since the overseam-stitches alone would answer the requirements of goods made with a view to cheapness. The offset 4 also assists the spur 7 in preventing the hook from shifting upon the shoe-upper, since a shoulder is thereby formed which is backed up by one terminal of the line of overseam-stitches.

In lacing up a shoe equipped with our improved hooks the lacing-string is passed beneath the loop and wound partly around the same, the soft texture of the material of which the shoe-upper is made readily permitting the lace to pass between the inwardly-turned end 6 of the lace-engaging loop and the shoe-upper, as will be readily understood by reference to Fig. 1.

We have illustrated our improved lacing-hook in connection with a shoe; but of course such hook is equally applicable to other garments, such as gloves, corsets, &c.

By constructing the lacing-hook as herein described the lace-engaging loop extends in a plane approximately parallel with the surface of the shoe-upper and practically flat thereon, (being offset therefrom only sufficiently to permit the lacing-string to be easily passed under the hook,) so that no projections are presented on which the wearer's clothing may catch, the free end of said hook being turned inwardly against the shoe-upper as an additional safeguard in this respect.

Having thus described our invention, what we claim as new, and desire to secure by Letters Patent, is—

A lacing-hook adapted for attachment to the garment by means of an arcuate line of overseam-stitches, comprising an arcuate attaching-stem, over which said stitches are made, said stem terminating at one end in an anchoring-spur and provided at the other with a lace-engaging loop or hook bent inwardly toward said arcuate stem, the free end of said loop being also bent in a direction toward the garment, and an offset shoulder formed intermediate of said stem and loop and adapted to engage one terminal of said line of overseam-stitches, substantially as and for the purpose set forth.

Signed at Bridgeport, county of Fairfield, and State of Connecticut, this 26th day of June, A. D. 1901.

DONALD NOBLE.

Witnesses:
HERBERT A. HILL,
J. S. FINCH.

Signed at Philadelphia, county of Philadelphia, and State of Pennsylvania, this 27th day of June, A. D. 1901.

HENRY WALDEN.

Witnesses:
JOHN C. McKEON,
THEO. H. McCALLA.